US009402383B2

(12) United States Patent
Bonacic Kresic

(10) Patent No.: US 9,402,383 B2
(45) Date of Patent: Aug. 2, 2016

(54) INSECT-KILLING MONITORING TRAP FOR MASS CAPTURING AND CONTROLLING COTTON BOLL WEEVILS

(71) Applicant: INSTITUTO NACIONAL DE TECNOLOGIA AGROPECUARIA, Capital Federal (AR)

(72) Inventor: Ivan Bonacic Kresic, Chaco (AR)

(73) Assignee: Instituto Nacional de Tecnologia Agropecuaria, Capital Federal (AR)

( * ) Notice: Subject to any disclaimer, the term of this patent is extended or adjusted under 35 U.S.C. 154(b) by 258 days.

(21) Appl. No.: 13/934,939

(22) Filed: Jul. 3, 2013

(65) Prior Publication Data

US 2014/0007489 A1  Jan. 9, 2014

(30) Foreign Application Priority Data

Jul. 5, 2012  (AR) .............................. P20120102445

(51) Int. Cl.
*A01M 1/00* (2006.01)
*A01M 1/02* (2006.01)
*A01M 1/10* (2006.01)
*A01M 1/20* (2006.01)

(52) U.S. Cl.
CPC ................ *A01M 1/103* (2013.01); *A01M 1/00* (2013.01); *A01M 1/02* (2013.01); *A01M 1/10* (2013.01); *A01M 1/2005* (2013.01); *A01M 1/2011* (2013.01)

(58) Field of Classification Search
CPC .......... A01M 1/00; A01M 1/02; A01M 1/10; A01M 1/103; A01M 1/106; A01M 1/20; A01M 1/2005; A01M 1/2011; A01M 1/2016

USPC .................................... 43/107, 131, 121, 122
See application file for complete search history.

(56) References Cited

U.S. PATENT DOCUMENTS

| 571,925 A * | 11/1896 | Lynch ............................. 43/131 |
| 1,297,894 A * | 3/1919 | Navrot ............................ 43/122 |
| 1,450,382 A * | 4/1923 | Moore ............................ 43/133 |

(Continued)

FOREIGN PATENT DOCUMENTS

WO   WO 01/87940 A2   11/2001

OTHER PUBLICATIONS

Risco, "*Metamasius hemipterus* L. "Gorgojo Rayado de la Cana de Azucar": Control del Insecto en los Ingenios "San Carlos" y "Valdez" en Ecuador," Revista Peruana de Entolologia, 1967, pp. 82-95, vol. 10.

(Continued)

*Primary Examiner* — Darren W Ark
(74) *Attorney, Agent, or Firm* — Crowell & Moring LLP

(57) ABSTRACT

A trap for mass capturing and controlling the insect called "cotton boll weevil", comprising a tubular central body (1) having a bottom section provided with holes (11), a housing formed by a perforated lid (7) and a base or bottom lid (3) provided with holes (3B) and further including one or more openings (12) to allow insect entering the housing from the bottom section (1); b) an insecticide dispenser section (4) inside the housing, c) a hole section for venting and discharging vapors (5) located at a position that is farther from the base or bottom lid than the insecticide dispenser (4); d) a perforated vessel (8) to contain an attractant diffuser (14) outside the housing and above it, and e) a closure (9) of the perforated vessel (8) at its upper end.

10 Claims, 4 Drawing Sheets

(56) References Cited

U.S. PATENT DOCUMENTS

| | | | | |
|---|---|---|---|---|
| 1,458,538 | A * | 6/1923 | Moore | 43/133 |
| 1,482,420 | A * | 2/1924 | Wilson | 43/118 |
| 1,496,135 | A * | 6/1924 | Schwiening | A01M 1/02 43/118 |
| 1,496,386 | A * | 6/1924 | Sligh | 43/133 |
| 1,919,916 | A * | 7/1933 | Taylor | 43/107 |
| 1,953,947 | A * | 4/1934 | Bernitz, Sr. | 43/108 |
| 2,478,104 | A * | 8/1949 | Johnson | 43/122 |
| 3,803,303 | A | 4/1974 | McKibben et al. | |
| 3,885,341 | A * | 5/1975 | Kuchenbecker et al. | 43/121 |
| 3,949,515 | A * | 4/1976 | Mitchell et al. | 43/121 |
| 3,954,968 | A | 5/1976 | McKibben | |
| 3,987,577 | A * | 10/1976 | Hardee | 43/121 |
| 4,027,420 | A * | 6/1977 | McKibben et al. | 43/131 |
| 4,121,372 | A * | 10/1978 | Landaus | A01M 1/02 43/122 |
| 4,160,335 | A * | 7/1979 | Von Kohorn et al. | 43/131 |
| 4,471,563 | A * | 9/1984 | Lindgren | A01M 1/02 43/122 |
| 4,551,941 | A * | 11/1985 | Schneidmiller | A01M 1/04 43/121 |
| 4,611,425 | A * | 9/1986 | Dickerson | 43/121 |
| 4,642,936 | A * | 2/1987 | Jobin | A01M 1/02 43/122 |
| 4,802,303 | A * | 2/1989 | Floyd, III | A01M 1/02 43/131 |
| 5,170,583 | A * | 12/1992 | Coaker | A01M 1/02 43/107 |
| 5,392,560 | A * | 2/1995 | Donahue et al. | 43/122 |
| 5,557,880 | A * | 9/1996 | Schneidmiller | 43/122 |
| 6,018,905 | A * | 2/2000 | Lingren | 43/107 |
| 6,112,454 | A * | 9/2000 | Plato et al. | 43/121 |
| 6,183,733 | B1 | 2/2001 | McKibben | |
| 6,301,827 | B1 * | 10/2001 | Lankster | 43/122 |
| 6,316,017 | B1 | 11/2001 | McKibben et al. | |
| 6,393,760 | B1 * | 5/2002 | Lingren | 43/122 |
| 6,430,868 | B1 * | 8/2002 | Plato et al. | 43/121 |
| 6,532,695 | B1 * | 3/2003 | Alvarado | 43/122 |
| 6,966,142 | B1 * | 11/2005 | Hogsette et al. | 43/122 |
| 7,082,712 | B2 * | 8/2006 | Harris et al. | 43/122 |
| 7,310,907 | B2 * | 12/2007 | Suteerawanit | 43/122 |
| 7,402,302 | B2 * | 7/2008 | Plato et al. | 43/132.1 |
| 7,434,351 | B2 * | 10/2008 | Bette | 43/131 |
| 7,669,362 | B2 * | 3/2010 | Cwiklinski et al. | 43/122 |
| 8,943,742 | B2 * | 2/2015 | Aiayedh et al. | 43/121 |
| 8,943,743 | B2 * | 2/2015 | Plato et al. | 43/107 |
| 2003/0229919 | A1 | 12/2003 | Isaac et al. | |
| 2006/0130390 | A1 * | 6/2006 | Barilovits et al. | 43/108 |
| 2010/0139151 | A1 * | 6/2010 | Cwiklinski et al. | 43/107 |
| 2013/0152452 | A1 * | 6/2013 | Lazzarini et al. | 43/121 |
| 2013/0303574 | A1 * | 11/2013 | Gaugler et al. | 43/132.1 |

OTHER PUBLICATIONS

Rossignoli, ""Trampas quimicas" contra *Metamasius hemipterus* L. en el ingenio Valdez, Ecuador," Revista Peruana de Entomologia, 1972, pp. 165-168, vol. 15.

Hunter et al., "The Mexican cotton boll weevil," USDA Bureau Entomology Bulletin, 1905, vol. 51.

Daum et al., "Development of the bait principle for boll weevil control: cottonseed oil, a source of attractants and feeding stimulants for the boll weevil," Journal of Economic Entomology, 1967, pp. 321-325, vol. 60, No. 2.

McLaughlim, R.E., "Development of the bait principle for boll weevil control. II. Field cage tests with a feeding stimulant and the protozoan, *Mattesia grandis*," Journal Invertebrate Pathology, 1967, pp. 70-77, vol. 9.

Lloyd et al., "A red dye to evaluate bait formulations and to mass mark field populations of boll weevils," Journal Economic Entomology, 1968, pp. 1440-1444, vol. 61.

Tunilinson et al., "Sex pheromones produced by male boll weevils: isolation, identification and synthesis," Science, 1969, pp. 1010-1012, vol. 166.

\* cited by examiner

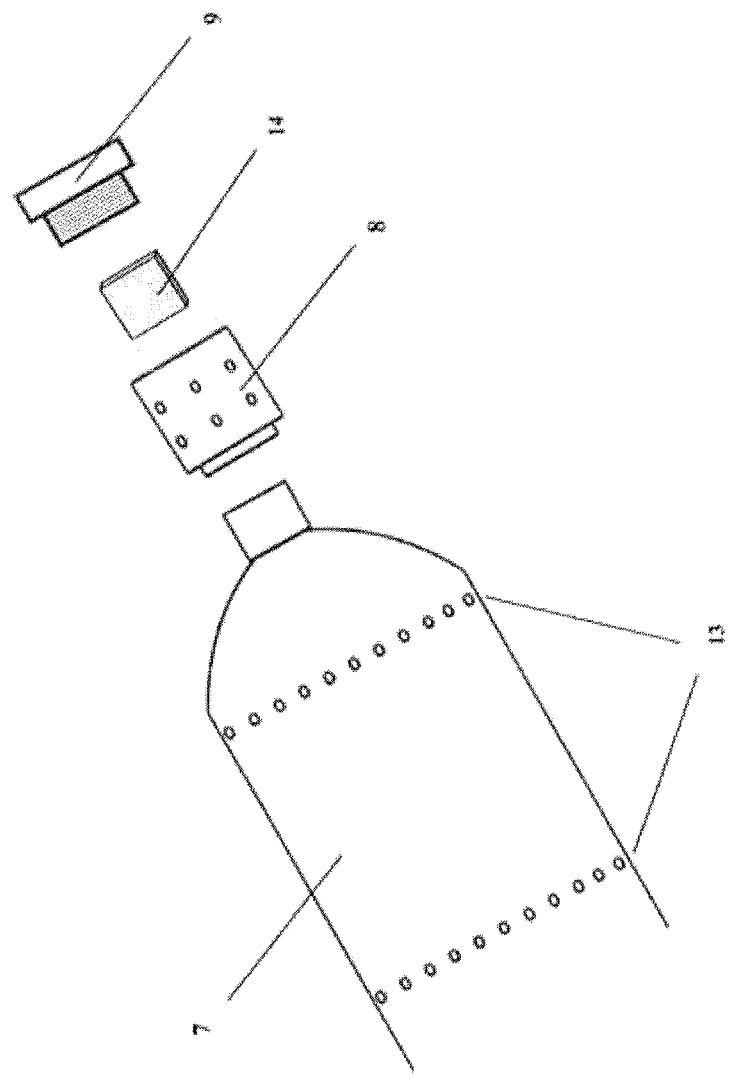

INSECT-KILLING MONITORING TRAP FOR MASS CAPTURING AND CONTROLLING COTTON BOLL WEEVILS

OBJECT OF THE INVENTION

The present document refers to a mass capture trap for monitoring and controlling the insect called "cotton boll weevil" (*Anthonomus grandis* Boh).

The device of the present invention uses pheromones (chemical substance secreted by an individual of an species that is capable of causing a certain kind of behavior in other individuals of the same species) and/or kairomones (chemical substances produced by an organism which can be perceived by another organism), the use of which allows to detect, monitor, mass capture and control the insect called "cotton boll weevil" (*Anthonomus grandis* Boheman, Coleoptera: Curculionidae).

Differences Between Toxic Baits and Traps.

Toxic baits are mixtures of an attractant substance with an insecticide. They are more important in the control of adult insects because the mobility of the individuals is essential for the efficiency of the bait, although baits are rarely used for the control of earthworms (noctuidae). The combination of sexual attractants with insecticides accounts for baits having great potential.

Some Examples of Baits:

Sugar cane borer *Metamasius hemipterus* L. may be controlled by means of baits prepared from a piece of sugar cane dipped into a dilution containing sugar cane molasses and insecticide. The pieces of sugar cane are hanged with a wire from the plants at a height of 40 cm and they are distributed all over the field and the areas surrounding it, with a renewal period of 15 days (Risco 1967; Rossignoli 1972). Against cutter ants, baits are used in the form of granules or "pellets" applied to the mouth of the nest so that ants will carry these baits inside the nest.

Use of Detection Traps and Control Traps

Traps are devices, structures or apparatuses to attract adult pest insects affecting plants by means of one or more attractants.

Traps may be used for the sake of detection or direct control, and they may contain chemical or luminous attractants. Traps using chemical attractants may be baited with food attractants or sexual attractants.

Detection traps (monitoring or tracking traps) are useful for determining the onset of seasonal infestation of a pest, its variations and its disappearance at the end of the campaign. This information allows to determine convenience and timing of insecticide applications and other control methods and to verify the success of the eradication measures that may have been taken against this pest.

Control traps are used to reduce pest populations in the field, and reduce the damages caused thereby. In order to kill the insects, it is possible to use insecticides involving different forms of action or any other systems such as surfaces having sticky substances, electrified grids, containers with water and oil, petroleum derivatives, or water with detergent, etc.

Working Principle of the Present Invention:

Several documents have discussed the importance of cotton pests and their negative effect on crop yield, particularly taking into account the arrival of the weevil to the USA. In this connection, many efforts have been made in the research of baits as a tool for the control of this insect (for trapping and killing purposes).

Therefore, several authors, Hunter et al (USDA Bur. Entomol. Bol., v 51, 181 pp, 25 1905), Daum et al (J. Econ. Entomol, v 60, 321-325, 1967), McLaughlin, (J. Invertir. Path., v 9, 70-77, 1967), Lloyd et al (J. Econ. Entomol., v. 61, 1440-1444, 1968) have tested substances which in some cases are obtained from the cotton plant itself (basically the oil extracted from the seeds), and in other cases are not, for example mixtures containing molasses and the like.

After the discovery of the first pheromones and their synthesis for use as attractants, (Tumlinson et al, Science, v 166, 1010-1012, 1969), the use of baits for controlling cotton boll weevils has increased. Most of these baits as previously investigated have been designed for application to foliage, when cotton bolls, the natural food for the weevil, are available. The competence of bolls, as well as the problems associated with application and susceptibility to rain wash, has prevented baits from being effective enough to be considered as a viable control method.

The device of the present invention is not a toxic bait. Instead, it is a trapping device combining the functions of monitoring traps and control traps, because it allows to observe and monitor the pest, when baited with attractants (pheromone Grandlure®, kairomones or other available attractants) and it carries out control operations, because it contains an insecticide supplying means acting by contact, inside the capture chamber.

The working principle of the present invention, similar to a number of traps for several insect pests as currently used worldwide, is based on an attraction effect of the odors released by chemical products attracting the target species, i.e. pheromones and/or kairomones, the vapors of which are spread, in a sufficient amount, from the capture device to the environment surrounding it; a capture chamber designed in such a way the target insect can easily enter said chamber while it is difficult for it to escape therefrom, and a section, inside said chamber, containing an insecticide supplying means or support where the insect will move and get trapped; said insect will be intoxicated by contact and it will finally die, confined to this chamber.

In the device of the present invention, the supplying means of both the attractants and the insecticide, are removable and renewable within a certain period depending on the product used, the manufacturer's recommendations and the results of the experiences encountered in this sense.

FIELD OF THE INVENTION

As mentioned above, the device of the present invention is useful for combat and ethological control of "cotton boll weevil" (*Anthonomus grandis* Boh) pest, the damages of which, either due to feeding or egg laying, result mainly in flower bud losses, also affecting the fruit (bolls) of cotton plants. The device may be manufactured by the plastic industry and/or other industries involved in the manufacture of apparatuses, devices and special elements for killing or controlling insects, and it may be marketed by specialized stores.

From an overall point of view, pest control has come a long way from the time entomologists discovered generation of insecticide resistance in insects, back in the 1950's. In view of this, many efforts have been made to recover and test new control alternatives for crop protection which are safe, effective, inexpensive and which also protect and take care of the population's health as well as the environment.

In this context, it is possible to state that the integral control of pests aims at "maintaining the damage level of the phytosanitary problems (insect pests, diseases, and weeds), below the economically acceptable threshold, combining different problem management and control measures." Within said measure, it is possible to mention chemical, mechanical, biological, cultural and ethological control. The latter benefits from the insect behavioral reactions against the presence or occurrence of stimuli, mainly of chemical nature, although physical and mechanical stimuli may also occur. From the practical point of view, ethological control applications include the use of pheromones, or other attractants, in traps and baits.

As previously stated, traps are devices attracting insects to be captured or killed, formed by an attraction source, which may be either a chemical attractant (related to foods or sexual attraction among insects) or a physical attractant (such as light), and a mechanism capturing the attracted insects.

The use of traps has the advantages that they are selective, they do not leave loose toxic waste materials, they operate in a continuous way, they are not affected by crop agricultural conditions, and, in many cases, they have low operative costs, among other advantages.

BACKGROUND

Insect attraction by using physical attractants (for example: light, colors or the like) or chemical attractants (pheromones and/or kairomones, or the like) towards a device (ranging from the simplest devices to the most complex ones), with the goal of capturing the insects, either for monitoring certain pest populations or for killing them, by means of a control agent (physical or chemical) is a principle on which substantially all the globally used traps or toxic baits are based. Besides, it is an important tool for a number of crop pest control programs and there is a great number of national and international publications in this field.

There are systems and devices manufactured and/or distributed by supplier companies in the local market, pursuing a goal that is similar to that of the present invention. Amongst them, it is possible to mention two devices for capturing and controlling a pest: a "boll weevil trap" with synthetic pheromone (Grandlure®) and a "tube for killing cotton boll weevils" (*Anthonomus grandis* Boh).

The "boll weevil trap" is formed by three adjustable pieces: a frusto-conical body or base provided with holes, a plastic or metal mesh cone, and collector cylinder or lid. The body is painted green and supports the two remaining parts, the mesh cone (either metallic or plastic) connecting the body and the collector cylinder together. This mesh allows pheromone diffusion from the supplying means positioned in the collector cylinder. The collector chamber, or capture chamber, inside of which the means supplying the pheromone (commercially marketed as Grandlure®) and the insecticide (dichlorvos or DDVP) is/are positioned, is made of a transparent plastic material and it is laterally perforated, to allow diffusion of pheromone which is released mainly by the collector base, positioned at the top of the mesh cone, and being removable for the sake of emptying. The trap is fixed to the ground by means of a wooden stake ranging from 1.20 cm to 1.50 m in height, which is laterally attached to the body or base of the trap (buried into the ground) and along which the insects climb, thereby entering (to the interior of the trap) through the inlet holes provided in the frusto-conical body or may climb along its outer face and, eventually, keep away from being trapped. In theses traps having a metal mesh cone, while insects enter the traps and get captured, they die and accumulate between the collector cylinder walls and the end portion of the mesh cone, wherein the only inlet hole to the capture chamber is located. The disadvantage of these traps is that, if the number of individuals trapped and killed is high, the chamber is quickly filled up, thus stopping subsequent captures, either because the inlet hole is blocked or because the pheromone diffusion is interfered.

In view of this, one of the disadvantages of the well-known "boll weevil traps" is that not all the attracted insects enter the device and get trapped therein. Besides, pheromone release is produced through the holes of the collector cylinder and the joining portion between the cylinder and the mesh cone, located at a distance of 1.20 to 1.50 m from the ground, which, under certain circumstances, may prevent the insect from finding the exact location of the trapping device.

The solution to the prior art problem supplied by the present invnetion is a trap with a foot through which weevils will climb, that facilitates central entrance of the insects to the capture body of the device, in order to minimize escapes through the outer side walls thereof, and to avoid pheromone releases along the device's body (from the ground to the capture area itself). This allows integrating the base as an active part of the attraction and capture device, since the insecticide and pheromone dispensers are positioned far from the area where the captured and killed insects will accumulate, thus avoiding any blockage of the insect inlet bore that leads to the collector chamber or capture vessel and keeping free from any interferences of the pheromone release. The device of the present invention provides this solution.

Another well-known commercially available device "tube for killing boll weevils", also known as "TMP" (Tubo Mata Picudos), a specific device for attracting and killing cotton boll weevils which slowly releases pheromone (Grandlure®) to attract the insects. The device consists of a biodegradable cardboard tube, 90 cm tall, yellowish-green in color (an attractive color to the insect), coated with a mixture of Malathion® insecticide. At the upper part of the tube, pheromone Grandlure® 60 milligrams (mg) is inserted, which is diffused through the holes present on the body of the device, in order to attract the boll weevil towards the TMP. Control is performed when the insect walks along the tube and gets poisoned with the insecticide. As it feels the effects of the poison, it will get away from the tube and, in most cases, die far away from the tube, which also is a drawback. The TMP has a service life of about 50 to 60 days after it is placed in the field.

Another disadvantage of the "TMP" system is that the tube having attractive colors and being impregnated all over its surface with the insecticide lacks a mechanism allowing to prevent people or animals from eventually contacting the pesticide, which, in the case of minor-scale cotton producers involved in family farming, would imply a huge risk to the family members, especially children, and farm animals. On the other hand, at the end of the service life of the TMP (from 50 to 60 days following placement thereof), said TMP becomes a waste element difficult to eliminate in a system that attempts safe handling of agrotoxic waste materials.

The solution to the above-mentioned problem is providing a device that poisons the insect and, in turn, diminishes the risk of contact with the pesticide-impregnated parts by humans and animals by reducing the poisoned surface, and prevents toxic waste materials from accumulating because it has a longer service life. This is also solved by the device of the present invention.

Several international documents have been published in this field, namely:

Document WO 01/87940 A2 discloses an encoded gene to combat coleopterans. However, the specification and drawings thereof show an apparatus used for this purpose which is based on a mechanical action that shakes the plants to be treated.

U.S. Pat. No. 3,803,303 describes compounds made of Grandlure®, glycol, and derivatives thereof, in the form of pellets to release the product attracting the weevil within brief periods.

U.S. Pat. No. 3,949,515 describes an apparatus for capturing cotton boll weevils comprising a cylindrical base attached to a wire-mesh inverted funnel which leads into a transparent rectangular or square retaining vessel with an attractant therein.

U.S. Pat. No. 3,987,577 describes a boll weevil trap comprising a support means or base, preferably colored or painted fluorescent yellow, and an open-ended hollow guiding means releasably mounted on the upper end of the support means. A plastic body in the shape of an inverted funnel leading into a spherical container is placed onto the base, said container functioning as a capture chamber inside of which pheromone Glandlure® and insecticide dispensers are located. The base thereof allows coupling with the above-mentioned plastic body. When the cotton boll weevil is attracted thereto by the combination of the fluorescent yellow color of said trap and the pheromone, the insect moves upwardly, enters the trap and is collected in the transparent and perforated collection chamber at the upper end of the trap.

U.S. Pat. No. 3,954,968 describes a synthetically prepared boll weevil attractant formulated in the form of a gelled emulsion containing crude cottonseed oil, used to trap and destroy cotton boll weevils for periods up to 2 weeks. It does not describe any capture trap.

U.S. Pat. No. 4,027,420 describes a method for attracting cotton boll weevils by using pheromones (Grandlure®), in combination with other substances (toxic substances and other attractants) applied to a device designed for being air dropped onto cotton plants.

U.S. Pat. No. 4,160,335 describes devices for the controlled delivery and release of pest controlling substances, and methods for producing and utilizing them in pest control programs. It consists of laminated devices which comprise one or more layers containing active pest control and pest attractant substances and which allow the controlled release of the substances from within the laminate to the surface thereof so as to maximize efficiency against target species in the surrounding environment. The laminated structure also allows prolonged, and properly timed release of the substances (attractant and toxic substances) that might otherwise be prematurely dissipated, decomposed or inefficiently applied. Various combinations of polymeric materials, active agents, and a number of different laminated structures are employed to optimize the use of the pest controlling substance against target species.

U.S. Pat. No. 4,611,425 describes a boll weevil trap having a base member, an inverted wire mesh funnel, a capture chamber mounted over the apex of the wire-mesh funnel. This trap further includes a piece releasably mounted on the mouth of the funnel to retain the funnel in place and maintain the circular configuration of the funnel's mouth.

U.S. Pat. No. 6,183,733 describes compositions and methods for attracting, killing, and/or reducing populations of boll weevils and other insects which spend the winter in areas with thick vegetation. With respect to boll weevils, certain plant compounds, such as eugenol, beta-caryophyllene, and myrcene, as present in the leaves of the favorite overwintering sites of *Anthonomus grandis*, when employed along with Grandlure®, increase the capture of boll weevils by as much as 50% as compared to Grandlure® alone. These compounds can be used alone, in combination with Grandlure®, and/or in combination with compounds which are toxic to boll weevils or which inhibit their ability to develop normally or reproduce. With respect to controlling other overwintering insects, appropriate attracting compounds, besides the corresponding pheromones, can be identified from the leaf litter surrounding their overwintering sites. The compounds can be used in traps, or formulated into polymeric controlled release formulations, along with the Glandlure® and/or toxicants, insect growth regulators or insect sterilants. However, this document does not disclose any capture and control trap.

U.S. Pat. No. 6,316,017 describes a composition which includes a binder, a pigment, an insect toxicant, an insect feeding stimulant or a toxicant regeneration enhancer, and an ingredient which is both a filler and a thickener. The composition may be applied to a solid substrate to reproduce an article of manufacture which is both attractive and toxic to insect pests and therefore useful for insect control. FIG. 2 of this document shows a device including a substrate (1) that may be cylindrical in shape, although the configurations and sizes thereof may vary. The pointed end (3) facilitates inserting the substrate into ground (5). The substrate has coating (7) thereon, corresponding to a composition claimed by this document. Coating (7) may be formed by holding the pointed end (3) of substrate (1) and dipping the reminder of the substrate into the claimed liquid composition. Optionally, the article to be manufactured of this document may include cap (9), for example a polyvinyl chloride (PVC) cap (shown cut-away) on upper end (11) of substrate (1). According to this document, the cap may be made in line with the description of U.S. Pat. No. 5,290,556 by the same inventor. More specifically, this cap is a bait-insecticide composition comprising: a polymer, at least one insect pheromone, at least one insect pheromone, at least one insect feeding stimulant, and an insect toxicant. However, the device of the present invention is a trap for capturing and killing insects, especially cotton boll weevil *Anthonomus grandis*. The present invention does not claim any compositions comprising chemical substances, or attractants, or insecticides or any other agents, even though, for insect attraction, pheromones, kairomones (optional) and insecticides are used for the control thereof. As opposed to this document, the present invention does not consist of any substrate or support on which a substance or compound (by painting, oiling or dipping) is applied. On the contrary, the present invention comprises a capture chamber, inside of which a means supplying insecticide (removable and renewable) and another means containing kairomones (separated from the first one and also renewable) are located, higher up in the trap and completely separated from these means, a capsule (also renewable) where the attractant, pheromone Grandlure® or any other commercially available pheromone, is contained. Assay 1 of the mentioned patent teaches that the composition was applied to the stakes by dipping, and luminum pans were placed underneath to facilitate collection of the insects killed due to intoxication with the insecticide. This clearly shows that the US Patent is not a capture trap like the one described for the device of the present invention, where the insects get trapped and remain confined until they die inside the capture chamber.

U.S. Pat. No. 6,430,868 describes a trap for capturing coleopteran insects, comprising a base, a guiding element positioned upon the base and a chamber positioned upon the guiding element.

U.S. Pat. No. 7,402,302 describes compositions and methods for attracting, capturing and killing populations of cotton boll weevils (*Anthonomus grandis* Boh) in traps. With respect to the attraction and capture, it mentions a single dispenser containing Glandure® and insecticide dichlorvos (2,2-dichlorovinyl dimethyl phosphate—DDVP) to be employed in the capture and control of said insects (by killing them), in a trap that is similar to the one disclosed by U.S. Pat. No. 6,430,868.

Document US 2003/0229919 A1 describes a novel *Bacillus thuringiensis* gene encoding a Coleopteran inhibitory insecticidal crystal protein that provides plant protection from cotton boll weevils Ag, when applied to plants in an insecticidally effective composition. However, no capture trap is disclosed.

GENERAL DESCRIPTION OF THE INVENTION

The boll weevil-killing monitoring trap proposed by the invention shows a configuration which is new in the field of application, because it consists of a trapping device formed by three parts or elements, both adjustable and detachable, produced with plastic polymers, which does not release any odor when heated by the effects of the sun while also enduring UV rays, with an estimated service life of 5 to 6 agriculture campaigns, the elements being as follows:

a. —a central body formed by a preferably cylindrical hollow tube, having a thread at its upper end, and provided with holes through which insect attractant(s) is/are diffused all along thereof and on its four faces (in a multi-face profile version) or tangent lines opposed to each other (in a cylindrical version)

b. —a conical or spherical piece acting as a base or bottom lid, with the shape of an inverted funnel, and perforated for the diffusion of attractants, wherein the base or bottom lid has a short central stem holding the central tube, where at least one opening or preferably two inlet grooves are located along the tube, at the same height and diametrically opposed to each other, for insect entry (at least one, or preferably two inlet holes). An insecticide dispenser is located above the base or bottom lid, the dispenser being removable for pesticide renewal, and completely enclosing the tube of the main body, formed by a propylene strip for temporary attachment, on the surface of which entangled fibers forming loops are positioned. This strip is joined at its opposing ends by a narrower strip portion with spikes ending in the shape of hooks; upon pressing, these strips are engaged (commonly referred to as "hook and loop closure" or Velcro® type). On the fiber strip the powder contact insecticide is distributed (Carbaryl®, 85%, and other insecticides to be evaluated). Adjacently above the insecticide dispenser there is a tube section with a plurality of holes, for venting and discharging the vapors emanating from the pheromone diffuser, which will facilitate a higher concentration thereof in the chamber formed when mounting a lid of the device on the base or bottom lid, leading to higher attraction of the insect to that section (the insect previously contacting the insecticide dispenser and getting intoxicated). Above the densely perforated section of the tube, there is a plastic ring (clamp-type ring) which will act as an end stop to the lid and which further tightens a polyurethane foam strip impregnated with kairomones (cotton seed and derivatives thereof are also being studied) which will act as a further insect attractant;

b. —a transparent lid, preferably made of plastic material, glass or any similar material that is resistant to environmental conditions and UV rays. This lid is supported on the base or bottom lid positioned in the main body, and shows two peripheral rows having a minimum of 15 holes each, positioned at the upper and lower thirds of the lid body, for venting and discharging the vapors emanating from the diffuser containing pheromone-based attractants (in a container that is described below) and kairomone-based attractants (impregnated in the foam strip as mentioned above).

c. —a pheromone container, adjustable to the upper end of the central body, threaded inside and removable to allow trap emptying, inside of which the pheromone supplying means is placed. On its side walls, the vessel comprises two rows having a minimum of 15 holes each, for venting and discharging the vapors emanating from the pheromone-based attractant diffusers, and at the upper end a threaded plug is tightened, the plug being removable to allow pheromone replacement.

DESCRIPTION OF THE DRAWINGS

In order to further illustrate the description of the invention and with a view to provide a better understanding of the features of the invention, the following drawings are enclosed with the present specification, as an integral part thereof, and not intended to limit the invention but to illustrate the same, as follows:

FIG. 3 is a sectional view of the lid and the pheromone container, with the attractant diffusers and the threaded plug.

DETAILED DESCRIPTION OF THE INVENTION

Figure 2:
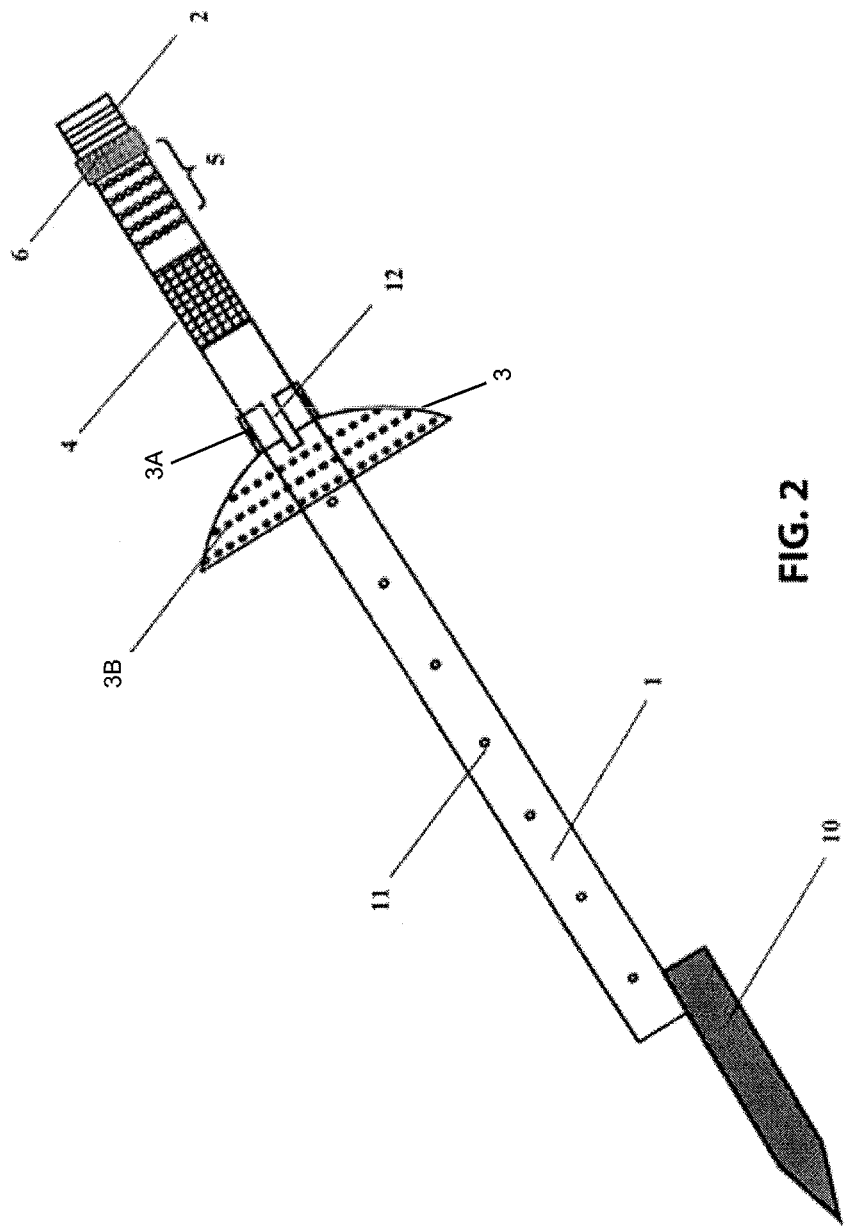
FIG. 2 is a side view of the main body of the trap further showing the parts thereof.

FIG. 2 shows that the trap of the present invention is formed by a hollow tubular central body (1) which has a bottom section with holes (11) to facilitate ventilation and discharge of vapors emanating from pheromone and/or kairomone-based attractant diffusers all along the main body (1). Above this bottom section, the tubular central body has a mid section carrying a base or bottom lid (3). The base or bottom lid (3) is formed by a preferably transparent body, which may have different shapes but is preferably conical or spherical in shape, provided with multiple holes (3B) and comprising a central short stem (3A) to attach the same to the central tube by compression, or the stem (3A) may be fixed to the central tube by a clip or pin, or screws. The short stem (3A) of the bottom lid includes one or more openings, and, in a preferred embodiment, these openings are implemented as two channels in the shape of longitudinal and lateral grooves (12), through which insects climbing up the main tubular body will enter, thus supplying them the perception that they are crawling up the stalk of the cotton plant. The housing is closed with a perforated lid (7), preferably transparent, that engages the bottom lid (3), by which the mid section of the tubular central body is enclosed inside a housing or capture chamber. Once the lid (7) engages the base or bottom lid (3), it is in turn sealed at its upper end by an end stop strip (6).

The the base or bottom lid (3) and the lid (7) are preferably made of plastic material due to its durability and resistance to weather conditions and UV radiation but, in other embodiments, it might be replaced, for example, with other materials such as glass, etc. Transparent materials are preferred for manufacturing the bottom lid (3) and the lid (7) because it allows seeing the trapped insects and also helps their attraction into the container.

Figure 1A:
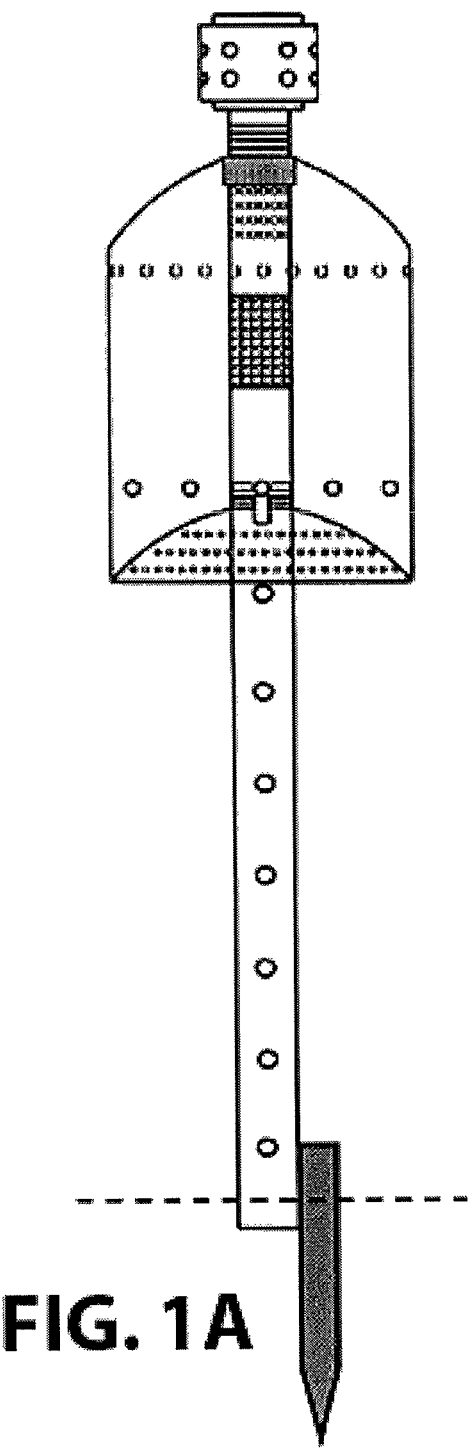
FIG. 1A is a side view of the trap of the present invention as completely assembled.
Figure 1B:
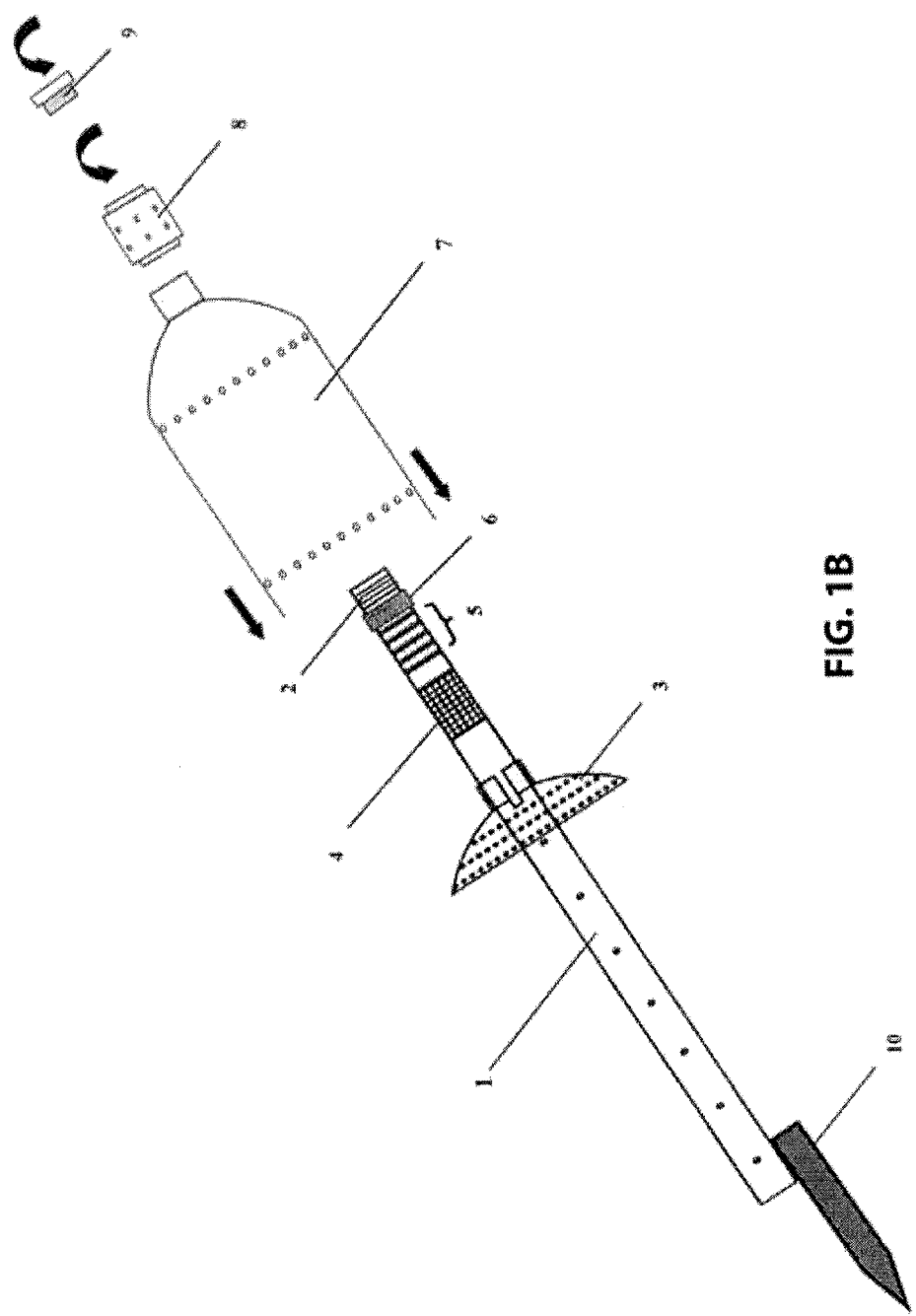
FIG. 1B is an exploded view of the main parts of the trap and the sequences for assembling the trap.

FIG. 1B, shows that the tubular central body ends in an upper section having a thread (2), to which a removable pheromone container (8) is secured, and above the whole assembly, a threaded lid (9) is placed, sealing its upper end. FIG. 3, shows that the perforated lid (7) forming the central housing is provided with at least 30 holes (13), for venting and discharging the vapors emanating from the pheromone diffusers, thereby attracting the insects towards the trap. In the housing formed when engaging the lid (7) to the bottom lid (3) the pheromone concentration is higher, because in the upper part of the central section of the tubular central body there is a section having a bigger number of holes (5) which facilitates pheromone venting and discharge, and preferably formed by four or more peripheral rows of holes. FIG. 3 shows that, above the central housing, a pheromone dispenser (14) is introduced, and the assembly is closed with the upper lid (9) which is engaged by means of the thread (2).

Back to FIG. 2, it may be seen that on the tubular central body (1), above the bottom lid (3) and underneath the section having a bigger number of holes (5), an insecticide dispenser section is located (4), being removable to allow its periodic replacement, and completely surrounding the tube of the main body (1), and towards which the insects will move to be intoxicated with the contact pesticide. When feeling the effects of the poison and trying to fly away, the insects will hit against the transparent side walls of the lid (7) of FIG. 1, and eventually die upon the base formed by the mating area between the lid (7) and the bottom lid (3) of the housing, where they will accumulate until the housing is emptied.

The tubular central body (1) is buried into the ground directly by its lower end, or alternatively by means of a wooden stake (10) laterally fixed with clamps or screws.

In a preferred embodiment of the present invention, the main body is formed by a tube (1) made of plastic material (1.8 to 2.1 cm diameter and 100 cm length), the tube having a threaded upper end (2) and a fixing stake (10) at the lower end. The removable insecticide dispenser (4) is made with an entangled fiber strip, the ends thereof being secured by another fiber strip with a hook ("hook and loop closure" or Velcro® type). In this embodiment, the end stop member (6) sealing the upper lid (9) is made with a polyurethane foam strip and the holes (11) of the tube (1) are spaced apart 10 cm from each other along their four tangent lines. In a preferred embodiment, the insecticide dispenser has a total surface area of 35 $cm^2$.

The materials, shape, size and arrangement of the elements may vary as long as this does not imply altering the essential nature of the invention.

The terms described in this specification shall be interpreted in their broad and non-restrictive sense.

The invention claimed is:

1. A trap for mass capture and control of a cotton boll weevil insect, comprising:
    a) a tubular central body formed by a cylindrical tube that has a bottom section provided with holes that are aligned axially with respect to the tubular central body along the bottom section;
    b) a housing formed by a perforated lid and a base or bottom lid that is supplied with holes and that is engaged to the tubular central body by a central stem, the central stem including one or more openings so that the insect can enter the housing from said bottom section;
    c) an insecticide dispenser section inside said housing and located on the tubular central body, the insecticide dispenser section comprising a strip having ends joined by a hook and loop closure;
    d) a hole section for venting and discharging vapors located on the tubular central body at a position that is farther from said base or bottom lid than said insecticide dispenser section;
    e) a perforated vessel to contain an attractant diffuser secured to the tubular central body outside said housing and at a position above said housing; and
    f) a closure of said perforated vessel at an upper end of the perforated vessel;
    wherein said one or more openings so that the insect can enter the housing comprises or comprise at least one longitudinal groove;
    wherein, if said at least one longitudinal groove is a plurality of longitudinal grooves, the longitudinal grooves are located at positions diametrically opposed to each other; and
    wherein the base or bottom lid is formed by an inverted conical funnel or a spherical section shaped element, and said perforated lid is sealed at its upper end by way of an end stop member.

2. The trap according to claim 1, wherein the insecticide dispenser section is removable.

3. The trap according to claim 2, wherein said insecticide dispenser section has a total surface area of 35 $cm^2$.

4. The trap according to claim 1, wherein the hole section for venting and discharging vapors is formed with four or more peripheral rows of holes.

5. The trap according to claim 1, wherein said end stop member is formed with a polyurethane foam strip.

6. The trap according to claim 1, wherein said closure of the perforated vessel is a threaded plug.

7. The trap according to claim 1, wherein said tubular central body, said base or bottom lid, said perforated lid, said perforated vessel, and said closure are made of plastic material.

8. The trap according to claim 1, further comprising a stake laterally fixed with clamps or screws to the tubular central body.

9. The trap according to claim 1, wherein a pheromone is used as an attractant.

10. The trap according to claim 1, wherein a kairomone is used as an attractant.

* * * * *